(12) United States Patent
Sampath et al.

(10) Patent No.: US 9,351,184 B2
(45) Date of Patent: May 24, 2016

(54) SYSTEM AND METHOD FOR TUNING MEDIUM ACCESS PARAMETERS

(71) Applicant: QUALCOMM Incorporated, San Diego, CA (US)

(72) Inventors: Hemanth Sampath, San Diego, CA (US); Simone Merlin, San Diego, CA (US); Vincent Knowles Jones, IV, Redwood City, CA (US); Gwendolyn Denise Barriac, Encinitas, CA (US); Bin Tian, San Diego, CA (US); Yan Zhou, San Diego, CA (US); Sameer Vermani, San Diego, CA (US); Rahul Tandra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 14/064,762

(22) Filed: Oct. 28, 2013

(65) Prior Publication Data

US 2014/0126471 A1 May 8, 2014

Related U.S. Application Data

(60) Provisional application No. 61/722,034, filed on Nov. 2, 2012.

(51) Int. Cl.
*H04W 4/00* (2009.01)
*H04W 24/08* (2009.01)
*H04W 48/16* (2009.01)
*H04W 40/16* (2009.01)

(52) U.S. Cl.
CPC .............. *H04W 24/08* (2013.01); *H04W 48/16* (2013.01); *H04W 40/16* (2013.01)

(58) Field of Classification Search
CPC .............................. H04W 24/08; H04W 48/16
USPC ........................................................ 370/328
See application file for complete search history.

(56) References Cited

U.S. PATENT DOCUMENTS

| | | | | |
|---|---|---|---|---|
| 5,852,780 | A * | 12/1998 | Wang ................... | H04W 16/04 455/450 |
| 2002/0131376 | A1* | 9/2002 | Wheatley, III ........ | H04W 52/24 370/328 |
| 2004/0185853 | A1* | 9/2004 | Kim .................. | H04W 36/0083 455/438 |
| 2007/0127380 | A1 | 6/2007 | Abraham et al. | |

(Continued)

OTHER PUBLICATIONS

Abusubaih M., "Cognitive Wireless Local Area Networks," 2009, 167 pages.

(Continued)

*Primary Examiner* — Asad Nawaz
*Assistant Examiner* — Syed S Ali
(74) *Attorney, Agent, or Firm* — Knobbe, Martens, Olson & Bear LLP

(57) ABSTRACT

Systems and methods for tuning media access parameters are disclosed. In one aspect an access point includes a receiver configured to receive at least one message from a second access point. The access point further includes a processor configured to coordinate with the second access point to select a value of a medium access parameter comprising one of a carrier sense threshold and an energy detection threshold for a wireless station. The processor may generate a message identifying the value of the medium access parameter and may further comprise a transmitter connected to the processor and configured to transmit the message to the station.

17 Claims, 7 Drawing Sheets

(56) References Cited

U.S. PATENT DOCUMENTS

| | | |
|---|---|---|
| 2007/0258419 A1 | 11/2007 | Zhao et al. |
| 2008/0032727 A1* | 2/2008 | Stephenson et al. ......... 455/513 |
| 2009/0247156 A1* | 10/2009 | Sampath et al. ............. 455/434 |
| 2010/0290355 A1* | 11/2010 | Roy et al. ..................... 370/252 |
| 2012/0219037 A1* | 8/2012 | Myers ................ H04B 1/7103 375/141 |
| 2013/0176902 A1 | 7/2013 | Wentink et al. |

OTHER PUBLICATIONS

Scalia L., et al., "MAC Parameters Tuning for Best Effort Traffic in IEEE 802.11e Contention-Based Networks," The Mediterranean Journal of Computers and Networks, Aug. 2006, 9 pages.

* cited by examiner

SYSTEM AND METHOD FOR TUNING MEDIUM ACCESS PARAMETERS

CLAIM OF PRIORITY UNDER 35 U.S.C. §119

The present application for patent claims priority to Provisional Application No. 61/722,034 entitled "SYSTEM AND METHOD FOR TUNING MEDIUM ACCESS PARAMETERS" filed Nov. 2, 2012, and assigned to the assignee hereof. Provisional Application No. 61/722,034 is hereby expressly incorporated by reference herein.

BACKGROUND

1. Field

The present application relates generally to wireless communications, and more specifically to systems, methods, and devices for tuning medium access parameters.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

SUMMARY

Various implementations of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations allow tuning of medium access parameters.

One aspect of the disclosure provides an access point. The access point includes a receiver configured to receive at least one message from a second access point. The access point further includes a processor configured to coordinate with the second access point to select a value of a medium access parameter comprising one of a carrier sense threshold and an energy detection threshold for a wireless station. The processor is further configured to generate a message identifying the value of the medium access parameter. The access point further comprises a transmitter connected to the processor and configured to transmit the message to the station.

Another aspect of the disclosure provides a method of wireless communication by an access point. The method includes receiving at least one message from a second access point. The method further includes coordinating with the second access point to select a value of a medium access parameter comprising one of a carrier sense threshold and an energy detection threshold for a wireless station. The method further includes generating, at the access point, a message identifying the value of the medium access parameter. The method further includes transmitting the message from the access point to the wireless station.

Another aspect of the disclosure provides an access point. The access point includes means for receiving at least one message from a second access point. The access point further includes means for coordinating with the second access point to select a value of a medium access parameter comprising one of a carrier sense threshold and an energy detection threshold for a wireless station. The access point further includes means for generating a message identifying the value of the medium access parameter. The access point further includes means for transmitting the message from the access point to the station.

DETAILED DESCRIPTION

Figure 1A:
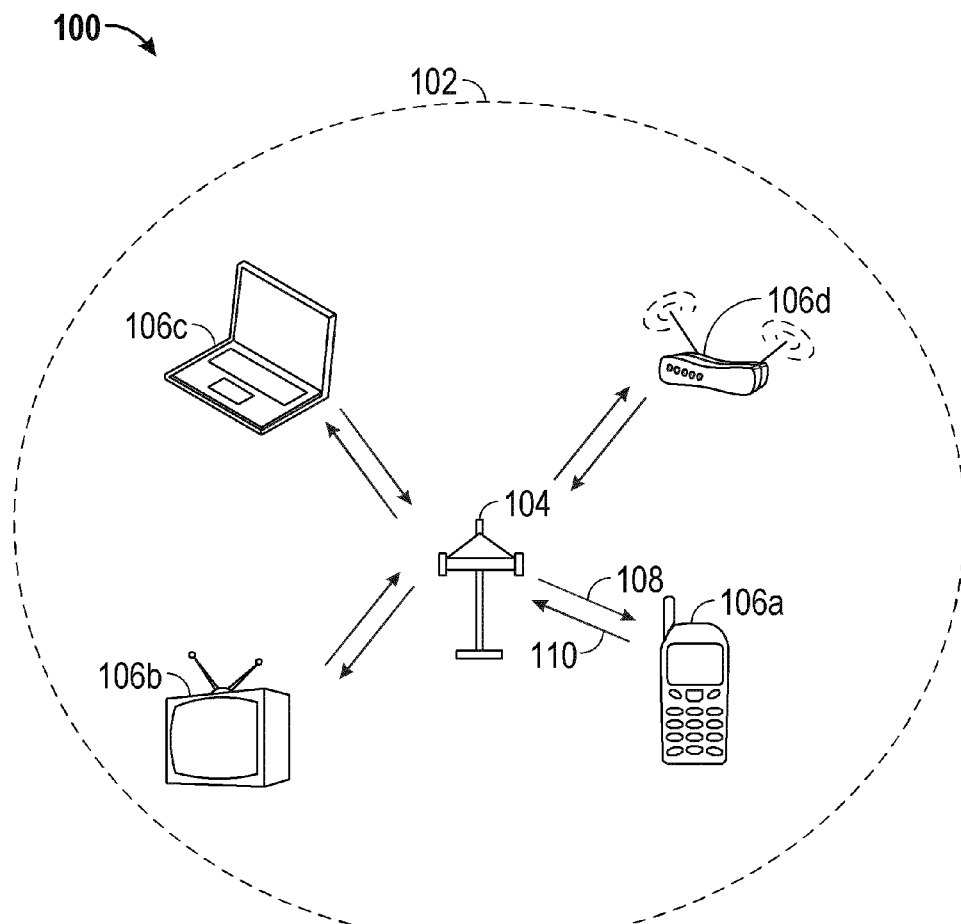
FIG. 1A illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11 ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and a STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations, an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1A illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The STAs 106 are not limited in type and may include a variety of different STAs. For example, as illustrated in FIG. 1A, STAs 106 can include a cellular phone 106a, a television 106b, a laptop 106c, and a number of sensors 106d (e.g. a weather sensor or other sensor capable of communicating using a wireless protocol), to name a few.

Figure 1B:
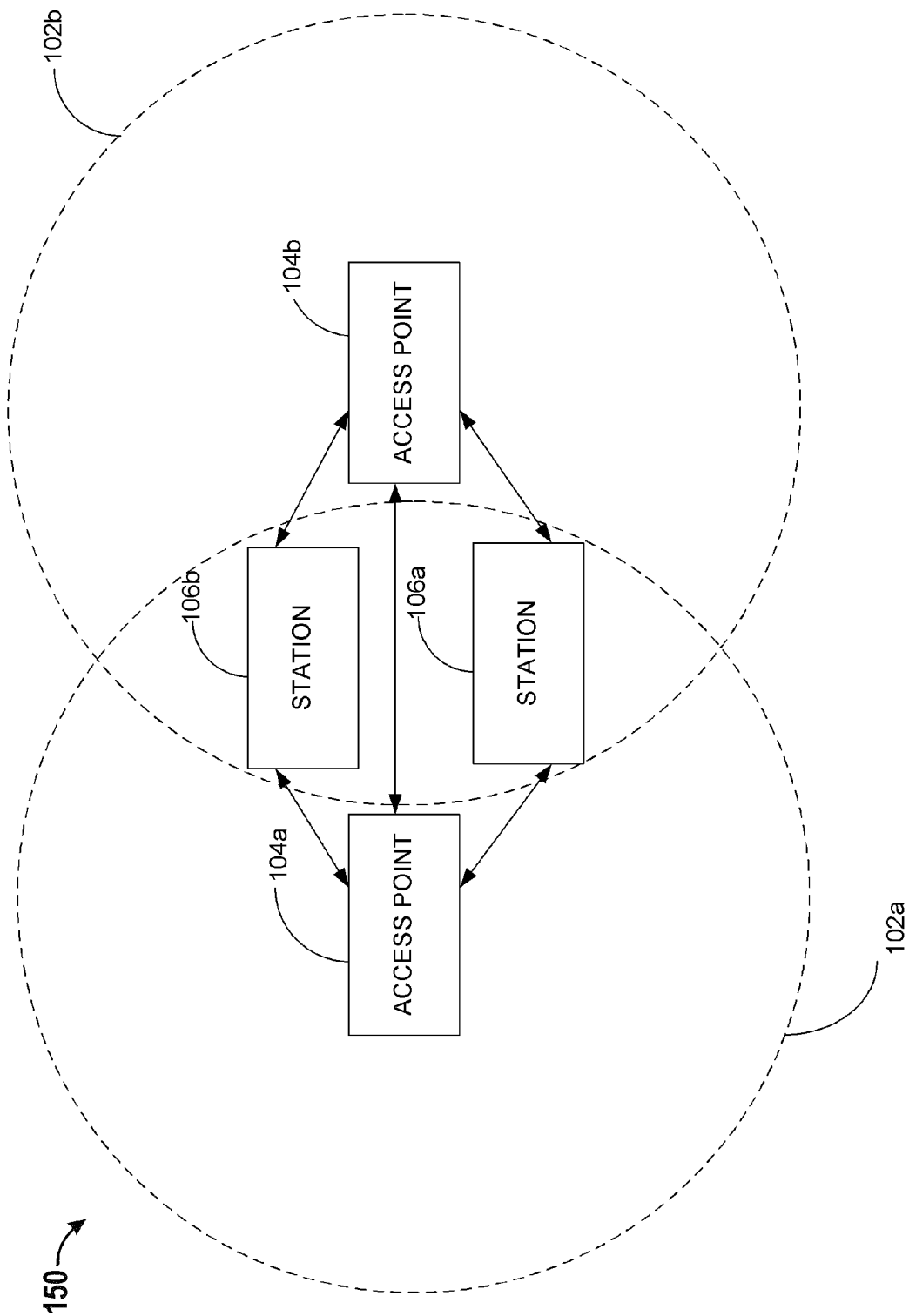
FIG. 1B illustrates an example of a wireless communication system in which aspects of the present disclosure may be employed.

FIG. 1B illustrates an example of a wireless communication system 150 in which aspects of the present disclosure may be employed. The wireless communication system 150 may operate pursuant to a wireless standard, for example the 802.11ah standard. The wireless communication system 150 may include a first AP 104a having a basic service area (BSA) 102a and a second AP 104b having a basic service area (BSA) 102b. In some embodiments, access points 104a and 104b may communicate as shown. In one embodiment, the communication may be over the wireless medium. In another embodiment, access points 104a and 104b may communicate over a back-haul network (not shown). The wireless communication system 150 also includes a station 106a and additionally may include a station 106b which are within both the BSA 102a of access point 104a and the BSA 102b of access point 104b.

Figure 2:
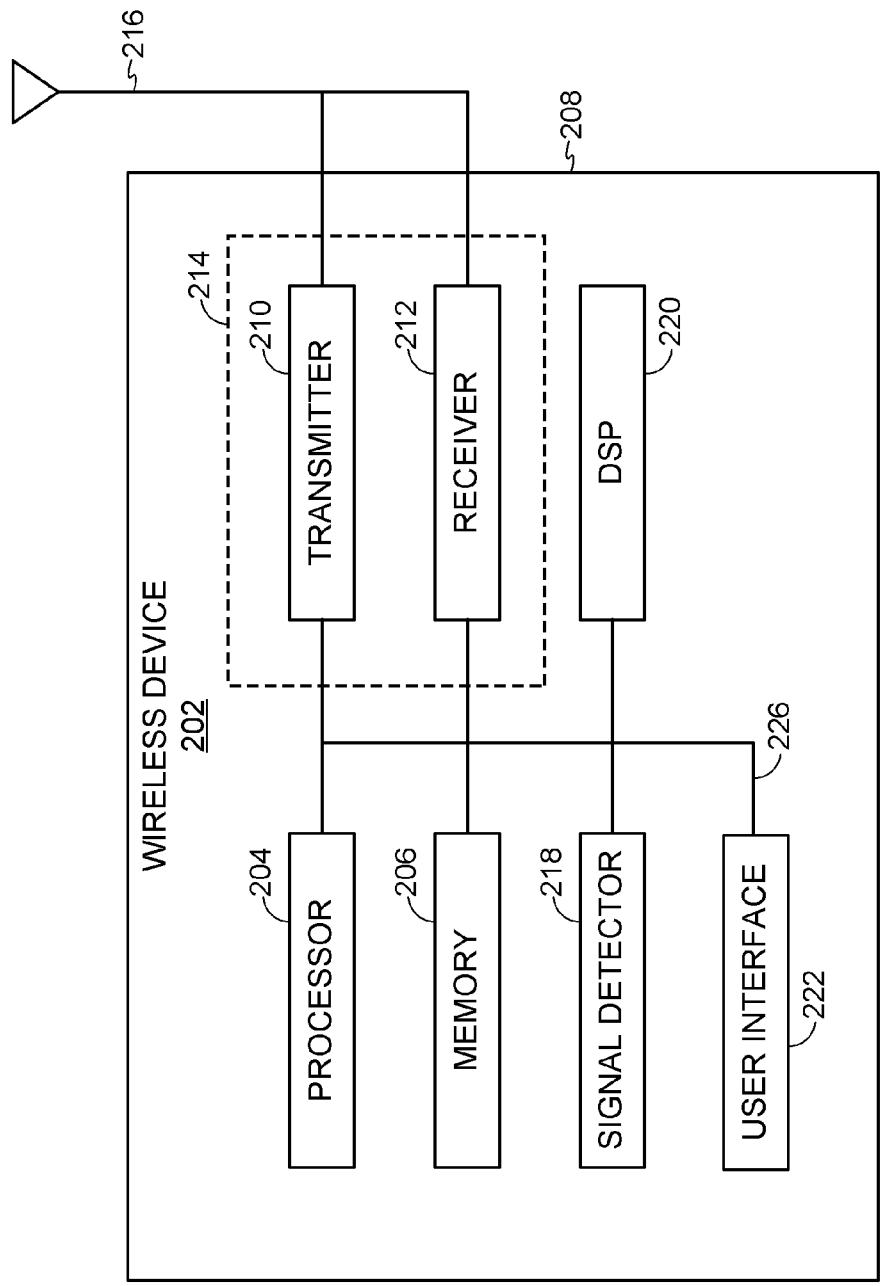
FIG. 2 illustrates an example of a wireless device that may be employed within the wireless communication system of FIGS. 1A and/or 1B.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise one of the APs 104a and 104b or one of the STAs 106a and 106b, for example.

The wireless device 202 may include a processor 204 which controls operation of the wireless device 202. The processor 204 may also be referred to as a central processing unit (CPU) or a hardware processor. Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a transmitter 210 and a receiver 212 to allow transmission and reception of data between the wireless device 202 and a remote location. Further, the transmitters 210 and the receiver 212 may be configured to allow transmission and reception of setup and/or configuration packets or frames between the wireless device 202 and a remote location including, for example, an AP or an STA. The transmitter 210 and receiver 212 may be combined into a transceiver 214. An antenna 216 may be attached to the housing 208 and electrically coupled to the transceiver 214. Alternatively, or additionally, the wireless device 202 may include an antenna 216 formed as part of the housing 208 or may be an internal antenna. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet or a frame.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be housed within a housing 208. Further, the various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together, or may accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

Figure 3:
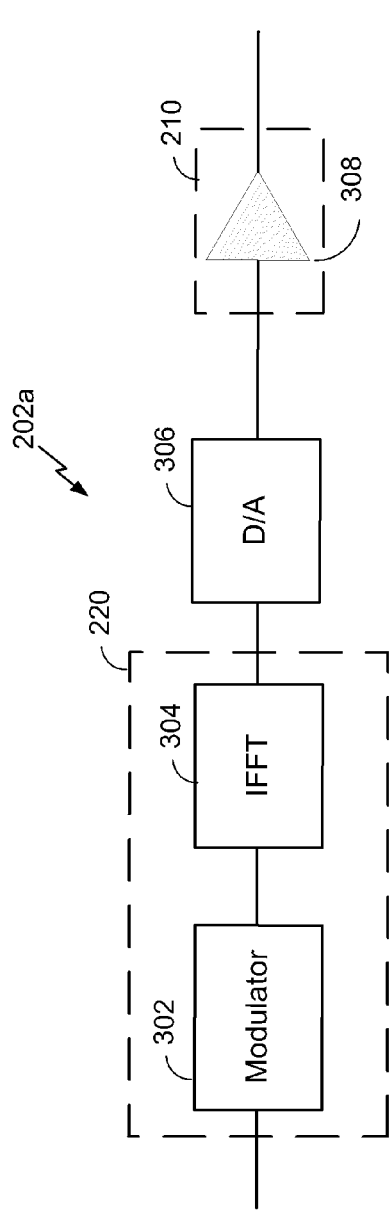
FIG. 3 illustrates an example of components that may be included within the wireless device of FIG. 2 to transmit wireless communications in accordance with one implementation.

As discussed above, the wireless device 202 may comprise an AP 104 or a STA 106, and may be used to transmit and/or receive communications. FIG. 3 illustrates various components that may be utilized in the wireless device 202 to transmit wireless communications in accordance with one implementation. The components illustrated in FIG. 3 may be used, for example, to transmit OFDM communications. In some aspects, the components illustrated in FIG. 3 are used to transmit data units with training fields with peak-to-power average ratio is as low as possible, as will be discussed in additional detail below. For ease of reference, the wireless device 202 configured with the components illustrated in FIG. 3 is hereinafter referred to as a wireless device 202a.

The wireless device 202a may comprise a modulator 302 configured to modulate bits for transmission. For example, the modulator 302 may determine a plurality of symbols from bits received from the processor 204 or the user interface 222, for example by mapping bits to a plurality of symbols according to a constellation. The bits may correspond to user data or to control information. In some aspects, the bits are received in code words. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 202a may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes.

In FIG. 3, the modulator 302 and the transform module 304 are illustrated as being implemented in the DSP 220. In some aspects, however, one or both of the modulator 302 and the transform module 304 are implemented in the processor 204 or in another element of the wireless device 202.

As discussed above, the DSP 220 may be configured to generate a data unit for transmission. In some aspects, the modulator 302 and the transform module 304 may be configured to generate a data unit comprising a plurality of fields including control information and a plurality of data symbols. The fields including the control information may comprise one or more training fields, for example, and one or more signal (SIG) fields. Each of the training fields may include a known sequence of bits or symbols. Each of the SIG fields may include information about the data unit, for example a description of a length or data rate of the data unit.

Returning to the description of FIG. 3, the wireless device 202a may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202. In some aspects, the digital to analog converter 306 is implemented in the transceiver 214 or in a data transmission processor.

The analog signal may be wirelessly transmitted by the transmitter 210. The analog signal may be further processed before being transmitted by the transmitter 210, for example by being filtered or by being upconverted to an intermediate or carrier frequency. In the implementation illustrated in FIG. 3, the transmitter 210 includes a transmit amplifier 308. Prior to being transmitted, the analog signal may be amplified by the transmit amplifier 308. In some aspects, the amplifier 308 comprises a low noise amplifier (LNA).

The transmitter 210 is configured to transmit one or more packets, frames, or data units in a wireless signal based on the analog signal. The data units may be generated using the processor 204 and/or the DSP 220, for example using the modulator 302 and the transform module 304 as discussed above.

Figure 4:
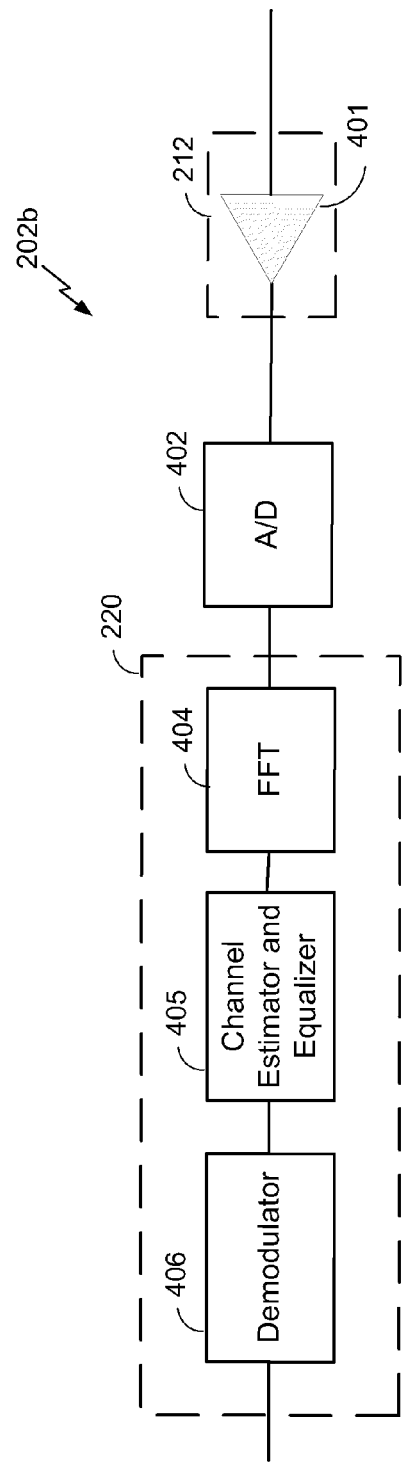
FIG. 4 illustrates an example of components that may be included within the wireless device of FIG. 2 to transmit wireless communications in accordance with one implementation.

FIG. 4 illustrates various components that may be utilized in the wireless device 202 to receive wireless communications in accordance with one implementation. The components illustrated in FIG. 4 may be used, for example, to receive OFDM communications. In some implementations, the components illustrated in FIG. 4 are used to receive packets, frames, or data units that include one or more training fields, as will be discussed in additional detail below. For example, the components illustrated in FIG. 4 may be used to receive data units transmitted by the components discussed above with respect to FIG. 3. For ease of reference, the wireless device 202 configured with the components illustrated in FIG. 4 is hereinafter referred to as a wireless device 202b.

The receiver 212 is configured to receive one or more packets, frames, or data units in a wireless signal.

In the implementation illustrated in FIG. 4, the receiver 212 includes a receive amplifier 401. The receive amplifier 401 may be configured to amplify the wireless signal received by the receiver 212. In some aspects, the receiver 212 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 202b may comprise an analog to digital converter 402 configured to convert the amplified wireless signal from the receiver 212 into a digital representation thereof. Further to being amplified, the wireless signal may be processed before being converted by the digital to analog converter 402, for example by being filtered or by being downconverted to an intermediate or baseband frequency. The analog to digital converter 402 may be implemented in the processor 204 or in another element of the wireless device 202. In some aspects, the analog to digital converter 402 is implemented in the transceiver 214 or in a data receive processor.

The wireless device 202b may further comprise a transform module 404 configured to convert the representation the wireless signal into a frequency spectrum. In FIG. 4, the transform module 404 is illustrated as being implemented by a fast Fourier transform (FFT) module. In some aspects, the transform module may identify a symbol for each point that it uses.

The wireless device 202b may further comprise a channel estimator and equalizer 405 configured to form an estimate of the channel over which the data unit is received, and to remove certain effects of the channel based on the channel estimate. For example, the channel estimator may be configured to approximate a function of the channel, and the channel equalizer may be configured to apply an inverse of that function to the data in the frequency spectrum.

In some aspects, the channel estimator and equalizer 405 uses information in one or more received training fields, such as a long training field (LTF) for example, to estimate the channel. The channel estimate may be formed based on one or more LTFs received at the beginning of the data unit. This channel estimate may thereafter be used to equalize data symbols that follow the one or more LTFs. After a certain period of time or after a certain number of data symbols, one or more additional LTFs may be received in the data unit. The channel estimate may be updated or a new estimate formed using the additional LTFs. This new or update channel estimate may be used to equalize data symbols that follow the additional LTFs. In some aspects, the new or updated channel estimate is used to re-equalize data symbols preceding the additional LTFs. Those having ordinary skill in the art will understand methods for forming a channel estimate.

The wireless device 202b may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204, or used to display or otherwise output information to the user interface 222. In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 220. In some aspects, however, one or more of the transform module 404, the channel estimator and equalizer 405, and the demodulator 406 are implemented in the processor 204 or in another element of the wireless device 202.

As discussed above, the wireless signal received at the receiver 212 comprises one or more data units. Using the functions or components described above, the data units or data symbols therein may be decoded evaluated or otherwise evaluated or processed. For example, the processor 204 and/or the DSP 220 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet, frame, or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

In wireless communications such as those specified in the IEEE 802.11 family of wireless protocols, multiple stations share a transmission medium using a media access control protocol called carrier sense multiple access (CSMA). With CSMA, a wireless station verifies the absence of other traffic before transmitting on the shared transmission medium. However, CSMA sometimes suffers from traffic collisions and hidden nodes which create interference. Thus it is beneficial to tune various medium access parameters to reduce undesired interference and to adjust medium reuse in order to optimize network performance, especially in dense WiFi deployments.

In implementations as will be described below, an access point (AP) sends a message to instruct each station independently on using specific values of one or more medium access parameters. In one implementation, the value of the medium access parameter is tuned by the AP on a per-station basis. In one implementation, neighboring APs communicate with each other to coordinate the decisions on medium access parameters that may impact the operation of all of them, as may be shown by FIG. 1B, for example. When APs are not able to communicate directly in the wireless medium, stations of different basic service sets may be used to relay coordination information between the APs. When APs are not able to communicate directly in the wireless medium, a backhaul connection may be used to relay coordination information between the APs. The coordination among APs may provide improved throughput and fairness. These implementations may be applied in processes and standards associated with IEEE 802.11 among others. These implementations may be applied in processes associated with CSMA, 802.11 enhanced distribution channel access (EDCA), or any other media access control protocols.

Figure 5:
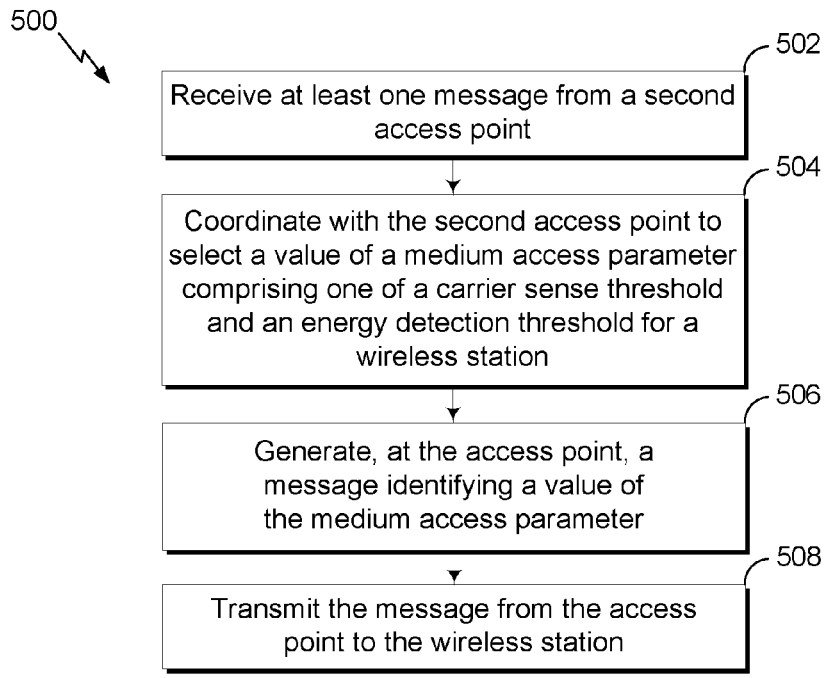
FIG. 5 is a flowchart of a method of wireless communication by an access point in accordance with one implementation.

FIG. 5 is a flowchart of a method of wireless communication by an access point in accordance with one implementation. The method 500 may be performed by an apparatus for wireless communication, such as the access point (AP) 104a shown in FIG. 1B. At block 502, the method includes receiving at least one message from a second access point. The second access point may correspond to the AP 104b shown in FIG. 1B. The message may be received by, for example, the transmitter 210 shown in FIG. 2.

Moving to block 504, the method includes coordinating with the second access point to select a value of a medium access parameter comprising one of a carrier sense threshold and an energy detection threshold for particular wireless station. The coordination may be implemented by, for example, the processor 204 shown in FIG. 2. The AP may coordinate with neighboring APs to select the value of the medium access parameter for the wireless station. Any distributed or centralized algorithms may be used for the APs to coordinate the decisions on medium access parameters that may impact the operation of all of them. The AP may be in direct communication with the neighboring AP. When these APs do not directly detect each other, stations of different basic service sets may be used to relay coordination information between the APs either implicitly or explicitly. Such coordination information may include special messages issued by an AP including an identification of the originating AP and an identification of the destination AP so it may be relayed by the stations. Such coordination information may also be implicitly measured by a STA and forwarded to an AP, without explicit instruction for another AP.

Moving to block 506, the method includes generating, at the access point, a message identifying the value of the medium access parameter. The message may be generated by, for example, the processor 204 shown in FIG. 2.

Moving to block 508, the method includes transmitting the message from the access point to the wireless station. The message may be transmitted by, for example, the transmitter 210 shown in FIG. 2. The method 500 thus allows an AP to tune the parameters for medium access in a wireless station.

The AP may be associated with a plurality of wireless stations. In one implementation, the AP may identify a separate value of the medium access parameter for each of the plurality of stations. In other words, the value of the medium access parameter may be determined on a per-station basis. In one implementation, the AP identifies different values of the medium access parameter for at least two of the plurality of wireless stations.

In one implementation, the AP identifies a value of a medium access parameter for a station. In other implementations, the AP may generate a message identifying values of two or more medium access parameters for the wireless station.

The AP may identify a value of any medium access parameter for the wireless station. In one implementation, the medium access parameter is one of a carrier sense threshold and an energy detection threshold. With CSMA, a wireless node tries to detect the presence of a carrier wave from another station before attempting to transmit. Carrier sense threshold specifies a threshold for the carrier sensing and may be used to adjust the packet detection sensitivity. Energy detection threshold refers to a threshold which determines if the detected WiFI or non-Wi-Fi energy level on a channel is adequate to report the medium as busy or idle. In another implementation, the medium access parameter may further comprise one of a retry limit and a maximum duration of a packet. Retry limit defines the number of retries allowed for retransmitting a packet. Maximum duration of a packet specifies the maximum duration allowed for transmitting a packet.

The medium access parameter may also be one of the parameters for enhanced distributed channel access (EDCA). With EDCA, high-priority traffic has a higher chance of being sent than low-priority traffic. A station with high priority traffic waits a little less before it sends its packet, on average, than a station with low priority traffic. This is accomplished by using a shorter contention window (CW) and shorter arbitration inter-frame space (AIFS) for higher priority packets. The exact values depend on the physical layer that is used to transmit the data. In addition, EDCA provides contention-free access to the channel for a period called a Transmit Opportunity (TXOP). A TXOP is a bounded time interval during which a station can send as many frames as possible (as long as the duration of the transmissions does not extend beyond the maximum duration of the TXOP). If a frame is too large to be transmitted in a single TXOP, it should be fragmented into smaller frames. The use of TXOPs reduces the problem of low rate stations gaining an inordinate amount of channel time. The parameters for EDCA may include arbitration inter-frame spacing number, minimum contention window duration, maximum contention window duration, and maximum duration of TxOP. The arbitration inter-frame spacing number represents a longer or shorter arbitration inter-frame space.

The AP may tune the medium access parameter based on various information such as network topology, traffic pattern and interference conditions. In one implementation, the method may further include receiving a measurement message from the wireless station, the measurement message including measurements of the medium access at the particular wireless station, wherein the value of the medium access parameter for the wireless station is identified by the AP based at least in part on the measurement message. The AP may tune the medium access parameter of the wireless station based on measurements at the wireless station or based on measurements from all of its associated wireless stations including the wireless station. The measurements may be made of the medium access or the network performance at the wireless station. Such measurement may include, for example, measurements of traffic pattern and interference conditions.

Figure 6:
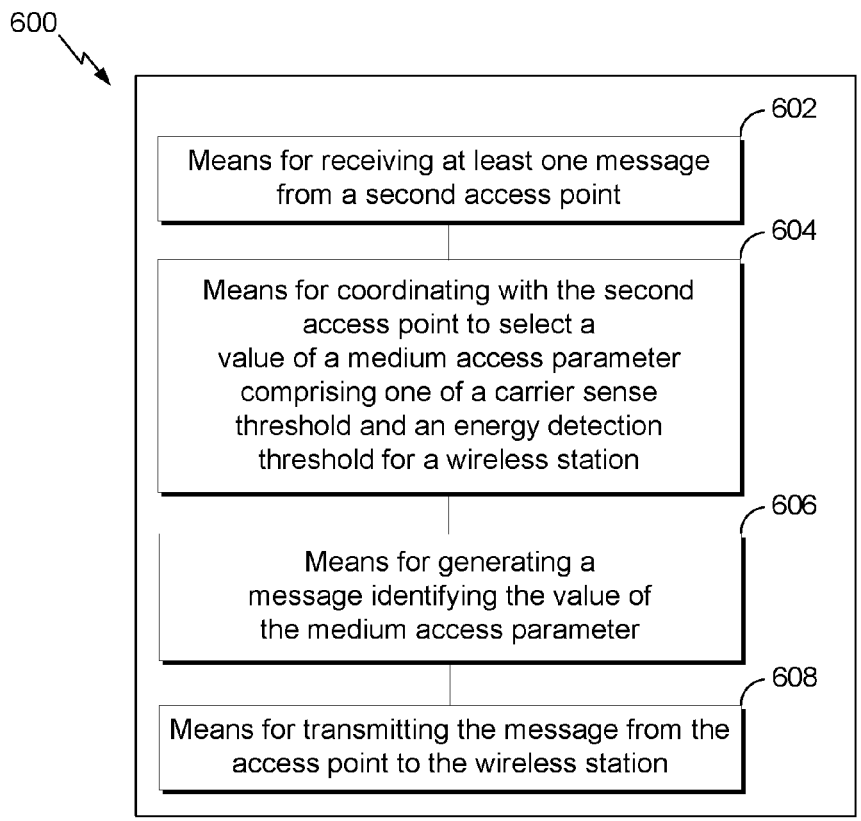
FIG. 6 is a simplified block diagram of several sample aspects of an access point in accordance with one implementation.

FIG. 6 is a simplified block diagram of several sample aspects of an access point in accordance with one implementation. Those skilled in the art will appreciate that the access point may have more components than illustrated in FIG. 6. The access point 600 includes only those components useful for describing some prominent features of implementations within the scope of the claims. In one implementation, the access point 600 is configured to perform the method 500 shown above in FIG. 5. The access point 600 may be any suitable access point, such as the access point 104a shown in FIG. 1B, which may be shown in more detail as the wireless device 202 shown in FIG. 2.

In one implementation, the access point 600 includes means 602 for receiving at least one message from a second access point. In an implementation, the means 602 can be configured to perform one or more of the functions described above with respect to block 502 of FIG. 5. The means 602 may comprise the receiver 212 shown in FIG. 2, for example.

The access point 600 may further include means 604 for coordinating with the second access point to select a value of a medium access parameter comprising one of a carrier sense threshold and an energy detection threshold for a wireless station. In an implementation, the means 604 can be configured to perform one or more of the functions described above with respect to block 504 of FIG. 5. The means 604 may comprise at least the processor 204 shown in FIG. 2, for example.

The access point 600 may further include means 606 for generating a message identifying the value of the medium access parameter. In an implementation, the means 606 can be configured to perform one or more of the functions described above with respect to block 506 of FIG. 5. The means 606 may comprise at least the processor 204 shown in FIG. 2, for example.

The access point 600 may further include means 608 for transmitting the message from the access point to the wireless station. In an implementation, the means 608 can be configured to perform one or more of the functions described above with respect to block 508 of FIG. 5. The means 608 may comprise at least the transmitter 210 shown in FIG. 2, for example.

Figure 7:
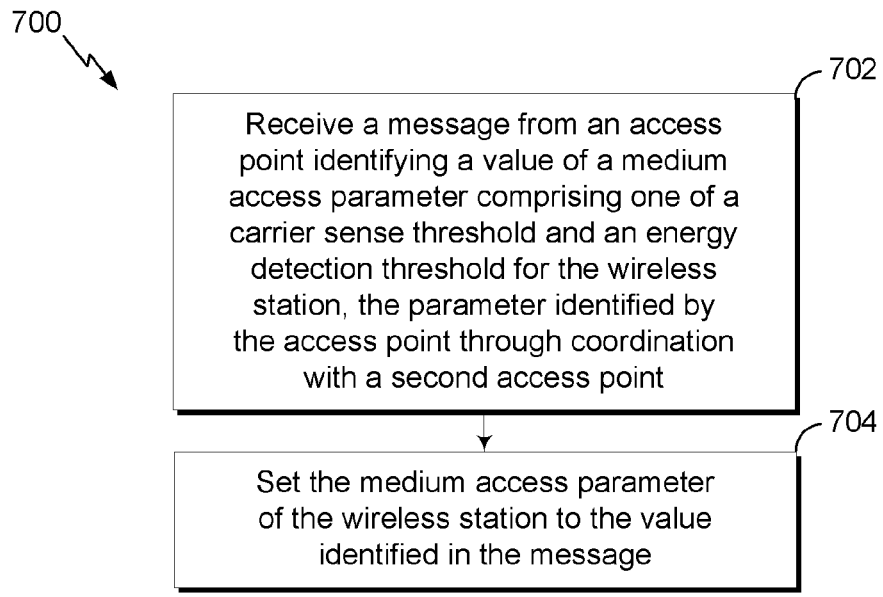
FIG. 7 is a flowchart of a method of wireless communication by a wireless station in accordance with one implementation.

FIG. 7 is a flowchart of a method of wireless communication by a wireless station in accordance with one implementation. The method 700 may be performed by an apparatus for wireless communication, such as the wireless station 106a and/or 106b shown in FIG. 1B, for example. At block 702, the method includes receiving a message from an access point identifying a value of a medium access parameter comprising one of a carrier sense threshold and an energy detection threshold for the wireless station, the parameter identified by the access point through coordination with a second access point. The message may be the message transmitted by an access point as described above with regard to FIG. 5. The message may be received by, for example, the receiver 212 as shown in FIG. 2.

Moving to block 704, the method includes setting the medium access parameter of the wireless station to the value identified in the message. The medium access parameter may be set to the value identified in the message by, for example, the processor 204 as shown in FIG. 2. The method 700 thus allows the parameters for medium access in a wireless station to be controlled by an AP.

The AP may identify a value of any medium access parameter for the wireless station. In one implementation, the medium access parameter is one a carrier sense threshold and an energy detection threshold. In another implementation, the medium access parameter may further comprise a retry limit and a maximum duration of a packet. The medium access parameter may also be one of the parameters for enhanced distributed channel access (EDCA) including: arbitration inter-frame spacing number, minimum contention window duration, maximum contention window duration, and maximum duration of TxOP.

In one implementation, the method may further include transmitting a measurement message to the access point, the measurement message including measurements of the medium access at the wireless station for use by the access point to identify the value of the medium access parameter. The AP may tune the medium access parameter of the wireless station based on measurements at the wireless station or based on measurements from all of its associated wireless stations including the particular wireless station. The measurements may be made of the medium access or the network performance at the station. Such measurement may include, for example, measurements of traffic pattern and interference conditions.

Figure 8:
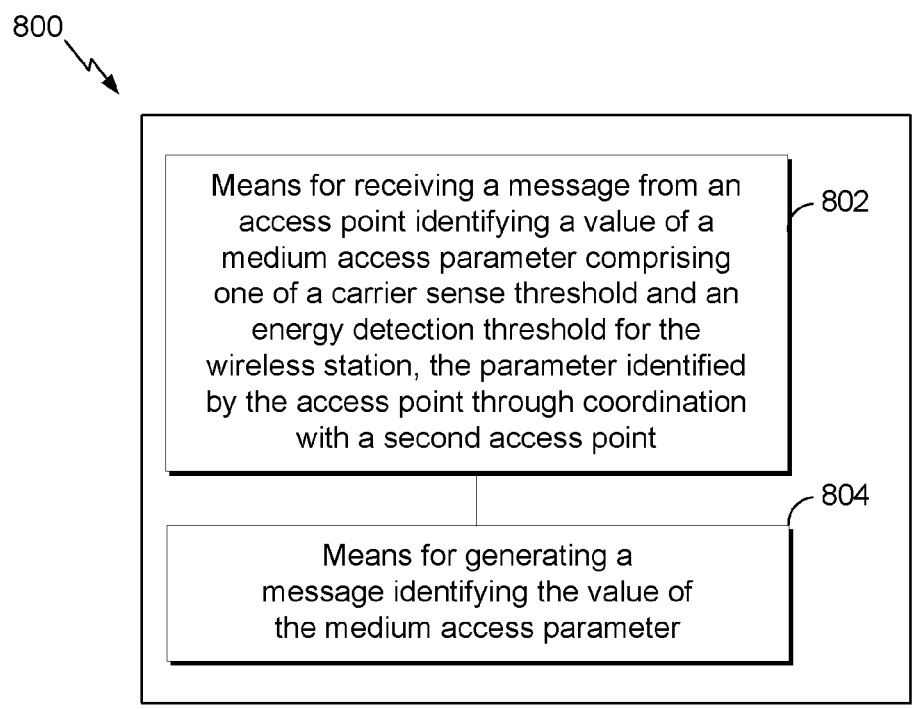
FIG. 8 is a simplified block diagram of several sample aspects of a wireless station in accordance with one implementation.

FIG. 8 is a simplified block diagram of several sample aspects of a wireless station in accordance with one implementation. Those skilled in the art will appreciate that the wireless station may have more components than illustrated in FIG. 8. The wireless station 800 includes only those components useful for describing some prominent features of implementations within the scope of the claims. In one implementation, the wireless station 800 is configured to perform the method 600 (shown above in FIG. 6). The wireless station 800 may be any suitable wireless station, such as the wireless station 106a or 106b shown in FIG. 1B, which may be shown in more detail as the wireless device 202 shown in FIG. 2.

In one implementation, the wireless station 800 includes means 802 for receiving a message from an access point identifying a value of a medium access parameter comprising one of a carrier sense threshold and an energy detection threshold for the wireless station, the parameter identified by the access point through coordination with a second access point. In an implementation, the means 802 can be configured to perform one or more of the functions described above with respect to block 702 (FIG. 7). The means 802 may comprise the receiver 212 shown in FIG. 2, for example.

The wireless station 800 may further include means 804 for setting the medium access parameter of the wireless station to the value identified in the message. In an implementation, the means 804 can be configured to perform one or more of the functions described above with respect to block 704 (FIG. 7). The means 804 may comprise at least the processor 204 shown in FIG. 2, for example.

Figure 9:
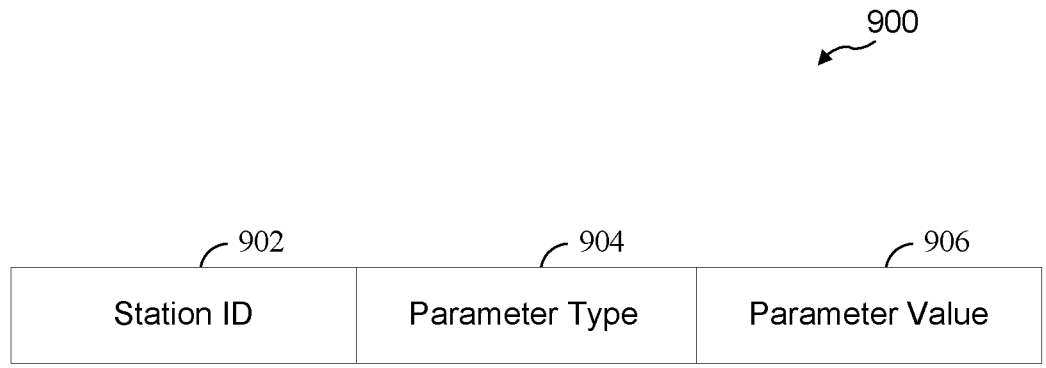
FIG. 9 shows a message identifying a value of a medium access parameter for a wireless station in accordance with one implementation.

FIG. 9 shows a message identifying a value of a medium access parameter for a wireless station in accordance with one implementation. The message 900 may be transmitted from an AP to a wireless station as described above with regard to FIG. 5. The message 900 may be transmitted using any process and method suitable for transmissions from the AP to the wireless station. For example, the message 900 may be transmitted with OFDM technique, CDMA technique, on-off keying, or frequency-shift keying.

In the illustrative implementation, the message identifies a value of a medium access parameter for a wireless station. The message 900 includes three portions. The first portion 902 includes a station identification of the wireless station to which the message is addressed. The second portion 904 includes a parameter type identifying the medium access parameter which the AP is tuning. The third portion 906 includes a parameter value for the medium access parameter. The message allows a wireless station to tune the medium access parameter accordingly upon receipt of the message.

In one implementation, the message may identify values for two or more medium access parameters for a wireless station. For each medium access parameter, the message may include a parameter type 904 followed by a parameter value 906 identifying the medium access parameter and the corresponding value for the parameter.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An access point comprising:
a receiver configured to:
receive at least one message from another access point, and
receive a measurement message from a wireless station, the measurement message including measurements of a medium access at the wireless station;
a processor configured to:
coordinate with the other access point in a selection of a value of a medium access parameter of the medium access based at least in part on the at least one message from the other access point and the measurement message, wherein the medium access parameter comprises at least two of the following parameters for enhanced distributed channel access: arbitration inter-frame spacing number, minimum contention window duration, maximum contention window duration, and maximum duration of a time interval during which the wireless station has contention-free access to a channel, and
generate a message identifying the value of the medium access parameter; and
a transmitter connected to the processor and configured to transmit the message to the wireless station.

2. The access point of claim 1, wherein the access point is configured to be associated with a plurality of wireless stations including the wireless station, and wherein the processor is configured to identify the value of the medium access parameter separately for at least two of the plurality of wireless stations.

3. The access point of claim 1, wherein the medium access parameter further comprises one of a retry limit and a maximum duration of a packet.

4. The access point of claim 1, wherein the medium access parameter further comprises one of a carrier sense threshold or an energy detection threshold for the wireless station.

5. The access point of claim 1, wherein the processor is further configured to select the value of the medium access parameter for the wireless station based on one or more of the following: network topology, traffic pattern and interference conditions.

6. A method of wireless communication by an access point, comprising:
receiving at least one message from another access point;
receiving a measurement message from a wireless station, the measurement message including measurements of a medium access at the wireless station;
coordinating with the other access point in a selection of a value of a medium access parameter of the medium access based at least in part on the measurement message, wherein the medium access parameter comprises at least two of the following parameters for enhanced distributed channel access: arbitration inter-frame spacing number, minimum contention window duration, maximum contention window duration, and maximum duration of a time interval during which the wireless station has contention-free access to a channel;
generating, at the access point, a message identifying the value of the medium access parameter; and
transmitting the message from the access point to the wireless station.

7. The method of claim 6, wherein the access point is configured to be associated with a plurality of wireless stations including the wireless station, and wherein the value of the medium access parameter is identified separately for at least two of the plurality of wireless stations.

8. The method of claim 6, wherein the medium access parameter further comprises one of a retry limit and a maximum duration of a packet.

9. The method of claim 6, wherein the medium access parameter further comprises one of a carrier sense threshold or an energy detection threshold for the wireless station.

10. The method of claim 6, wherein the value of the medium access parameter for the wireless station is selected based on one or more of the following: network topology, traffic pattern and interference conditions.

11. An access point, comprising:
means for receiving at least one message from another access point;
means for receiving a measurement message from a wireless station, the measurement message including measurements of a medium access at the wireless station;

means for coordinating with the other access point in a selection of a value of a medium access parameter of the medium access based at least in part on the measurement message, wherein the medium access parameter comprises at least two of the following parameters for enhanced distributed channel access: arbitration interframe spacing number, minimum contention window duration, maximum contention window duration, and maximum duration of a time interval during which the wireless station has contention-free access to a channel;

means for generating a message identifying the value of the medium access parameter; and means for transmitting the message from the access point to the wireless station.

12. The access point of claim 11, wherein the means for receiving at least one message from the other access point comprises a receiver.

13. The access point of claim 11, wherein the means for coordinating with the other access point to select the value of the medium access parameter comprises a processor.

14. The access point of claim 11, wherein the means for generating the message identifying the value of the medium access parameter comprises a processor.

15. The access point of claim 11, wherein the means for transmitting the message from the access point to the wireless station comprises a transmitter.

16. The access point of claim 11, wherein the means for coordinating with the other access point to select the value of the medium access parameter is further configured to select the value of the medium access parameter for the wireless station based on one or more of the following: network topology, traffic pattern and interference conditions.

17. The access point of claim 11, wherein the means for receiving the measurement message from the wireless station comprises a receiver.

* * * * *